United States Patent [19]

Bradford et al.

[11] Patent Number: 5,276,130

[45] Date of Patent: Jan. 4, 1994

[54] AMINOPLAST RESIN OR AMINOPLAST RESIN PRECURSOR

[75] Inventors: Christopher J. Bradford, Ann Arbor; Adriana E. Ticu, Livonia; Richard E. De Schepper, New Hudson, all of Mich.

[73] Assignee: BASF Corporation, Southfield, Mich.

[21] Appl. No.: 785,390

[22] Filed: Oct. 30, 1991

[51] Int. Cl.$^5$ .................. C08G 12/00; C07C 273/00; C08L 61/02; C07D 251/44
[52] U.S. Cl. .................. 528/230; 538/245; 538/259; 538/264; 538/266; 524/593; 525/398; 544/200; 544/204; 544/205; 544/211; 544/196; 544/197; 564/63; 564/502
[58] Field of Search .............. 528/230, 266, 245, 259, 528/264; 524/593; 525/398; 544/200, 204, 205, 211, 509, 511; 564/63, 502

[56] References Cited

U.S. PATENT DOCUMENTS

| | | | |
|---|---|---|---|
| 4,054,232 | 10/1977 | Cawley | 222/107 |
| 4,585,853 | 4/1986 | Plank et al. | 528/227 |
| 4,612,556 | 9/1986 | Pinot de Moira | 503/215 |
| 5,068,279 | 11/1991 | Morse | 528/230 |

OTHER PUBLICATIONS

"Synthesis of Acetoacetate Resins & Applications for Thermoset Coatings", by Del Rector & J. S. Witzeman. John Wiley, Encyclopedia of Polymer Science and Engineering, pp. 752–753 pp. 770–772.
Bradford et al., Process for Producing a Crosslinked Polymer Using A Beta-Bicarbonyl, Filing Date Aug. 15, 1991, patent application, pp. 1–30.
". . . for the Resins Market from Eastman, Tertiary-Butyl Acetoacetate (t-BAA) A New Monomer for the Synthesis of Acetoacetyl-Functional Resins".
"Reactions of Acetoacetylated polymers", Eastman Developmental products Publication No. X-263A, Dec., 1986.
"Acetoacetoxyethyl Methacrylate (AAEM) abd Acetoacetyl Chemistry" Eastman Chemicals Company, p. 719.
F. Del Rector et al, Journal of Coating Technology 61, 31–37, Apr. 1989.

Primary Examiner—John Kight, III
Assistant Examiner—Richard Jones
Attorney, Agent, or Firm—Paul L. Marshall

[57] ABSTRACT

According to the present invention, a $\beta$-dicarbonyl functionality, an $\alpha,\beta$-unsaturation functionality, or a vinylogous amide functionality is incorporated into an aminoplast resin or an aminoplast resin precursor.

13 Claims, No Drawings

AMINOPLAST RESIN OR AMINOPLAST RESIN PRECURSOR

FIELD OF THE INVENTION

This invention relates to aminoplast resins or precursors thereof having functional groups thereon capable of scavenging free formaldehyde.

BACKGROUND OF THE INVENTION

Aminoplast resins are thermosetting resins made by the reaction of an aminoplast resin precursor (e.g., an amine such as melamine, urea, or an amide) with an aldehyde (e.g., formaldehyde). The resins can be used in a variety of applications, including molding, protective coatings, ion-exchange resins, and adhesives, to name but a few. Common thermosetting aminoplast resins are trimethylol melamine, methylol urea, dimethylol urea, ethylene diamine, benzoguanamine, fully alkylated melamine, and partially alkylated melamine. Aminoplast resins are also highly useful as cross-linking agents for other polymers, such as acrylic polymers (e.g., amino- or hydroxyl-functional acrylic polymers, polyesters, epoxides, phenolics, and urethanes). Alkylated aminoplast resins (e.g., butylated trimethylol melamine) are useful as cross-linking agents.

One problem with aminoplast resins is related to the aldehyde used in the formation of the resin. The aldehyde is usually not fully consumed during the reaction with the aminoplast resin precursor, so some residual aldehyde is present in the uncured resin. Also, when the resin is cured, relatively large quantities of aldehyde are released as a result of the curing stage. Many aldehydes, such as formaldehyde, exhibit undesirable toxic and carcinogenic properties. It would thus be desirable if reductions could be achieved in the level of aldehyde present in uncured aminoplast resins and/or the amount of aldehyde released during the cure of aminoplast resins. It is toward this goal that the present invention is directed.

SUMMARY OF THE INVENTION

According to the present invention, aldehyde levels can be reduced by incorporating a β-dicarbonyl functionality, an α,β-unsaturation functionality, or a vinylogous amide functionality [for convenience, the term "unsaturated functionality" will be used hereinbelow as a generic term to cover these three functionalities] into an aminoplast resin or an aminoplast resin precursor. This can be accomplished by simply adding a compound comprising one of these functionalities to an aldehyde-containing aminoplast resin so that the compound will react with free aldehyde, or by incorporating a β-dicarbonyl functionality, an αβ-unsaturation functionality, or a vinylogous amide functionality directly into the aminoplast resin or aminoplast resin precursor molecule. Amine groups of the aminoplast resin or aminoplast resin precursor molecule in which such a functionality can be incorporated include those having the formula:

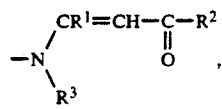

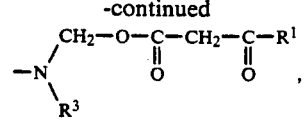

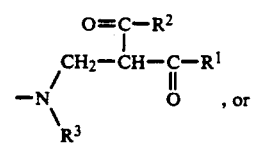

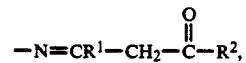

wherein
$R^1$ represents alkyl or aryl,
$R^2$ represents alkyl, aryl, or alkyoxy, and
$R^3$ represents —H, alkyl, aryl, or —$CH_2OR^4$ wherein $R^4$ represents alkyl, aryl, cycloaliphatic or hydrogen.

The unsaturated functionality can be incorporated directly into an aminoplast resin or it can be incorporated into an aminoplast resin precursor that can then be used to prepare an aminoplast resin. The resulting unsaturated-containing aminoplast resins are effective as traditional aminoplast thermosetting resins and cross-linking agents. They can also provide reductions in residual aldehyde levels in the aminoplast resin itself and in the amounts of aldehyde released during cure of such resins.

DESCRIPTION OF THE PREFERRED EMBODIMENTS

Aminoplast resins and aminoplast resin precursors into which a unsaturated functionality can be incorporated can be essentially any of the aminoplast resins known in the art. As used herein, aminoplast resin precursors are generally the diamines or polyamines that can be converted to curable aminoplast resins by reaction with an aldehyde (and optionally a monofunctional alcohol, e.g., methanol, butanol, i-butanol, 2-ethyl hexanol). Examples of useful aminoplast resin precursors include melamine, benzoguanamine, urea, glycoluril, and ethylene diamine. These aminoplast resin precursors can be reacted with aldehydes, such as formaldehyde and butyraldehyde, to form aminoplast resins. Examples of useful aminoplast resins that can be formed from such precursors are well-known in the art, and include trimethylol melamine, butylated trimethylol melamine, methylolurea, dimethylolurea, and the like.

The unsaturated functionality is preferably incorporated into the aminoplast resin or aminoplast resin precursor by attachment to one of the amino groups on the resin or resin precursor compound. Examples of amino groups to which the unsaturated functionality is attached include:

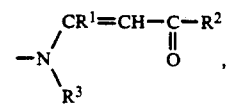

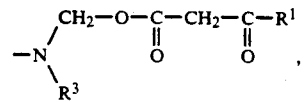

-continued

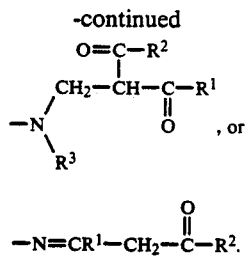

In these formulas, $R^1$ represents alkyl (including substituted alkyl), preferably of 1 to 4 carbon atoms (e.g., methyl, ethyl, t-butyl, and more preferably of 1 to 2 carbon atoms. $R^1$ can also represent aryl (including substituted aryl), preferably of 6 to 20 carbon atoms (e.g., phenyl, naphthyl, 2-chlorophenyl, 4-chlorophenyl, 2-tolyl, 4-tolyl). $R^2$ represents alkyl (including substituted alkyl), preferably of 1 to 8 carbon atoms (e.g., methyl, ethyl, n-propyl, n-butyl, i-butyl, 3-chloropropyl, benzyl), aryl as defined for $R^1$, or alkoxy, preferably of 1 to 8 carbon atoms, and more preferably of 1 to 4 carbon atoms (e.g., ethoxy, t-butoxy). $R^3$ represents hydrogen, alkyl or aryl as defined for $R^2$, or —CH$_2$OR$^4$ where $R^4$ represents alkyl or aryl as defined for $R^2$, hydrogen, or cycloaliphatic (including substituted cycloaliphatic, e.g., cyclohexyl, cyclopentyl, isobornyl).

In a preferred embodiment of the invention, the aminoplast resin or aminoplast resin precursor is melamine or a melamine derivative. Such compounds include those according to the formula:

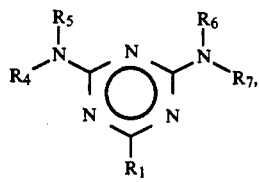

wherein
$R_1$ is phenyl or

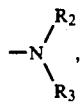

$R_2$, $R_3$, $R_4$, $R_5$, $R_6$, and $R_7$ are each independently —H, alkyl or aryl as defined above for $R^2$, —CH$_2$OR, =CR$^1$—CH$_2$—CO—R$^2$, —CR$^1$=CH—CO—R$^2$, —CH2—CHR$_9$—CO—R$^1$, or —CH$_2$—O—CO—CH$_2$—CO—R$^1$, with the proviso that at least one of $R_2$, $R_3$, $R_4$, $R_5$, $R_6$, and $R_7$ is =CR$^1$—CH$_2$—CO—R$^2$, —CR$^1$=CH—CO—R$^2$, —CH2—CHR$_9$—CO—R$^1$, or —CH$_2$—O—CO—CH$_2$—CO—R$^1$, and when one of $R_2$, $R_3$, $R_4$, $R_5$, $R_6$, and $R_7$ is =CR$^1$—CH$_2$—CO—R$^2$, the nitrogen to which it is attached does not have another R group attached thereto. According to this formula, $R_9$ represents —CO—R$^2$. R, $R^1$, and $R^2$ are as defined above.

The unsaturated functionality can be incorporated into the aminoplast resin or aminoplast resin precursor in several ways. It can be formed by reacting a β-diketoester or β-diketone with the amino group of an aminoplast resin precursor:

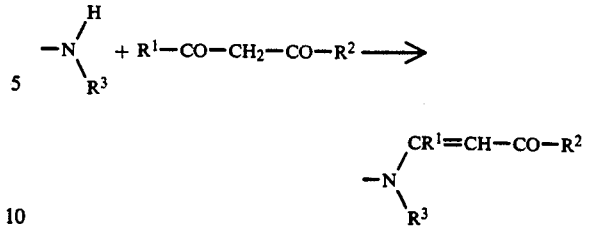

where $R^1$, $R^2$, and $R^3$ are defined above.

Alternatively, a β-diketoester or β-diketone can be reacted with the alkylol- or alkylated alkylol-substituted amino group of the aminoplast resin itself:

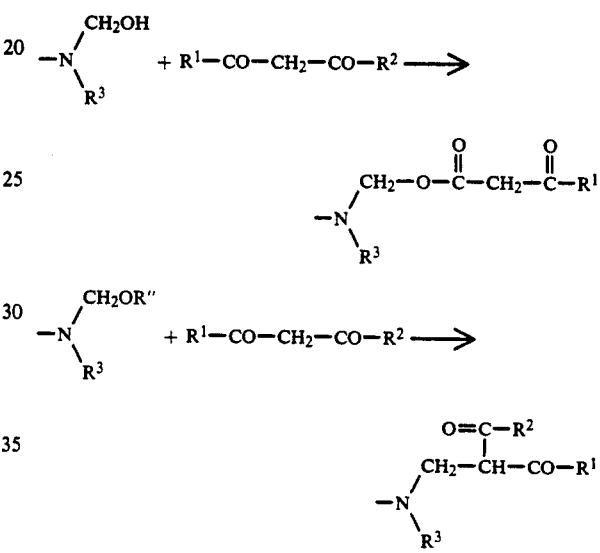

where $R^1$, $R^2$, and $R^3$ are as defined above.

Examples of β-diketoesters that would be useful in the practice of the present invention include t-butyl acetoacetate, ethyl acetoacetate, methyl acetoacetate, and aceto-acetoxy ethyl methacrylate. Additionally, it is contemplated that other β-diketones can be used in the preparation of compounds within the scope of the invention. Such β-diketones include, for example, 1,3-cyclohexanedione, 1,2-cyclopentadicarbonyl, and 2,4-pentanedione.

This invention relates both to the incorporation of β-diketones into an aminoplast resin or aminoplast resin precursor by reaction with the aminoplast compound, as well as incorporation by simply adding a compound comprising the unsaturated functionality (e.g., a β-diketone or β-diketoester) to an aminoplast resin composition that contains free aldehyde so as to react with or scavenge the free aldehyde, and thereby reduce the formaldehyde level in the aminoplast resin composition. Even when the unsaturated functionality is incorporated into the aminoplast resin molecule or aminoplast resin precursor molecule, it may be desirable to add additional amounts of a compound such as a β-dicarbonyl to the aminoplast resin composition containing free aldehyde. This can help prevent premature gelation due to cross-linking of the aminoplast resin through reaction of the unsaturated functionality sites on the resin molecule with free aldehyde in the resin composition.

One embodiment of the present invention relates to a method for incorporating the β-diketone group into an aminoplast resin precursor. This method is particularly useful for aminoplast resin precursors that are crystalline in nature, such as imino-functional aminoplast resin precursors, although the method can be advantageously used with non-crystaline aminoplast resin precursors as well. According to this method, the aminoplast resin precursor is suspended in a dipolar aprotic solvent. A β-diketoester compound is added to the suspension, and the mixture is refluxed until a sufficient amount of β-diketoester has reacted with the aminoplast resin precursor, as desired. Examples of useful dipolar aprotic solvents include glycolmethyl ether, diglycolmethyl ether, dimethyl sulfoxide, and dimethyl formamide. For non-crystalline compounds, other solvents may be used.

The invention if further described by the following example.

EXAMPLE 1

Melamine crystal (15.2 g) was suspended in 25 g of glycolmethyl ether in a flask equipped with a condenser. To this suspension was added 63.0 g of t-butylacetoacetate. The reaction mixture was heated to reflux and held at reflux for 48 hours. The resulting orange suspension was filtered and the crystals were washed with methyl ethyl ketone. The solvent was then removed, leaving the functionalized melamine. When the functionalized melamine was used to make melamine formaldehyde resin, a 14% reduction in residual formaldehyde level was obtained compared to melamine formaldehyde resin prepared with the unfunctionalized melamine.

The invention has been described in detail with reference to preferred embodiments thereof. It should be understood, however, that variations and modifications can be made within the spirit and scope of the invention.

What is claimed is:

1. An uncured aminoplast resin or aminoplast resin precursor comprising a β-dicarbonyl functionality, an α,β-unsaturation functionality, or a vinylogous amide functionality.

2. An aminoplast resin or aminoplast resin precursor according to claim 1 wherein the resin precursor is melamine or the aminoplast resin is obtained from melamine.

3. An uncured aminoplast resin or aminoplast resin precursor comprising at least one amino group having the formula:

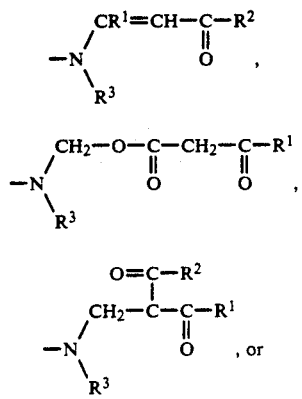

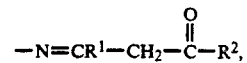

wherein
$R^1$ represents alkyl or aryl,
$R^2$ represents alkyl, aryl, or alkoxy, and
$R^3$ represents —H, alkyl, aryl, or —CH$_2$OR$^4$ wherein $R^4$ represents alkyl, aryl, cycloaliphatic, or hydrogen.

4. An aminoplast resin or aminoplast resin precursor according to claim 3 wherein $R^2$ is methyl, ethyl, ethoxy, or t-butoxy.

5. An aminoplast resin or aminoplast resin precursor according to claim 4 wherein $R^2$ is ethoxy or t-butoxy.

6. An aminoplast resin or aminoplast resin precursor according to claims 3 or 5 wherein $R^1$ is methyl or ethyl.

7. An aminoplast resin or aminoplast resin precursor according to any of claims 3, 4, or 5 wherein the resin precursor is melamine or the aminoplast resin is obtained from melamine.

8. An aminoplast resin or aminoplast resin precursor according to claim 6 wherein the resin precursor is melamine or the aminoplast resin is obtained from melamine.

9. An uncured aminoplast resin precursor or aminoplast resin obtained from an aminoplast resin precursor according to the formula:

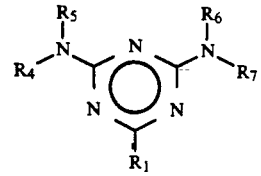

wherein
$R_1$ is phenyl or

$R_2$, $R_3$, $R_4$, $R_5$, $R_6$, and $R_7$ are each independently —H, alkyl, aryl, —CH$_2$OR, =CR$^1$—CH$_2$—CO—R$^2$, —CR$^1$=CH—CO—R$^2$, —CH$_2$—CHR$_9$—CO—R$^1$, or —CH$_2$—O—CO—CH$_2$—CO—R$^1$, with the proviso that at least one of $R_2$, $R_3$, $R_4$, $R_5$, $R_6$, and $R_7$ is =CR$^1$—CH$_2$—CO—R$^2$, —CR$^1$=CH—CO—R$^2$, —CH$_2$—CHR$_9$—CO—R$^1$, or —CH$_2$—O—CO—CH$_2$—CO—R$^1$ and further that if one of $R_2$, $R_3$, $R_4$, $R_5$, $R_6$, and $R_7$ is =CR$^1$—CH$_2$—CO—R$^2$, the nitrogen to which it is attached does not have the other $R_2$-$R_7$ group attached thereto, wherein R is hydrogen, alkyl, aryl, or cycloaliphatic,
$R_9$ is —CO—R$^2$,
$R^1$ represents alkyl, and
$R^2$ represents alkyl or alkoxy.

10. An aminoplast resin or aminoplast resin precursor according to claim 9 wherein $R_1$ is

11. An aminoplast resin or aminoplast resin precursor
according to claim 9 wherein $R^2$ is methyl, ethyl, ethoxy, or t-butoxy.
12. An aminoplast resin or aminoplast resin precursor according to claim 11 wherein $R^2$ is ethoxy or t-butoxy.
13. An aminoplast resin or aminoplast resin precursor according to claim 9 or 12 wherein $R^1$ is methyl or ethyl.
* * * * *